United States Patent
Den Hollander et al.

(10) Patent No.: US 11,132,802 B2
(45) Date of Patent: Sep. 28, 2021

(54) METHOD OF DETECTING MOVING OBJECTS FROM A TEMPORAL SEQUENCE OF IMAGES

(71) Applicant: Nederlandse Organisatie voor toegepast-natuurwetenschappelijk onderzoek TNO, s-Gravenhage (NL)

(72) Inventors: Richard Jacobus Maria Den Hollander, s-Gravenhage (NL); Jan Baan, Waddinxveen (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 90 days.

(21) Appl. No.: 16/491,888

(22) PCT Filed: Mar. 7, 2018

(86) PCT No.: PCT/NL2018/050139
§ 371 (c)(1),
(2) Date: Sep. 6, 2019

(87) PCT Pub. No.: WO2018/164575
PCT Pub. Date: Sep. 13, 2018

(65) Prior Publication Data
US 2020/0334832 A1    Oct. 22, 2020

(30) Foreign Application Priority Data
Mar. 8, 2017 (EP) .................................... 17159899

(51) Int. Cl.
*G06T 7/215* (2017.01)
*G06T 7/254* (2017.01)
*G06T 7/246* (2017.01)

(52) U.S. Cl.
CPC .............. *G06T 7/215* (2017.01); *G06T 7/246* (2017.01); *G06T 7/254* (2017.01); *G06T 2207/10016* (2013.01); *G06T 2207/10032* (2013.01)

(58) Field of Classification Search
CPC ......... G06T 7/215; G06T 7/254; G06T 7/246; G06T 2207/10016; G06T 2207/10032
(Continued)

(56) References Cited

U.S. PATENT DOCUMENTS

| 6,049,619 A | 4/2000 | Anandan et al. |
| 2008/0273751 A1* | 11/2008 | Yuan ....................... G06T 7/579 |
| | | 382/103 |
| 2018/0173983 A1* | 6/2018 | Zink .................... G06K 9/4638 |

FOREIGN PATENT DOCUMENTS

WO    9307585 A1    4/1993

OTHER PUBLICATIONS

Jan Chudoba, Miroslav Kulich, Martin Saska, Tomáš Báča Libor Přeučil. 2016. Exploration and Mapping Technique Suited for Visual-features Based Localization of MAVs. J Intell Robot Syst. 84:351-369.

(Continued)

*Primary Examiner* — Ayodeji O Ayotunde
(74) *Attorney, Agent, or Firm* — Banner & Witcott, Ltd.

(57) ABSTRACT

Moving objects are detected from a temporal sequence of images captured from successive viewpoints. Image flow vectors are computed from the temporal sequence of images, for example of flow between difference images derived from the sequence. An average direction of the image flow vectors associated with displacement of image areas between a first image and a second image derived from temporal sequence of images is computed. Preferably, a method of averaging is used that is designed to suppress the effect of outliers. Regions are determined in the first image. For each of the identified regions along range of positions along the computed average direction from a position of the identified region, it is determined whether or not there is a match between first image content in the identified region in the first image and second image content in a patch located within said range of positions in the second image. The set of identified regions is reduced by removing identified (Continued)

regions for which it was determined in said determining step that there was a match.

17 Claims, 3 Drawing Sheets

(58) Field of Classification Search
USPC .......................................................... 382/103
See application file for complete search history.

(56) References Cited

OTHER PUBLICATIONS

Lifei Liu, Long Zhao. 2014. Moving Target Detection Algorithm combine Background Compensation with Optical Flow. Proceedings of 2014 IEEE Chinese Guidance, Navigation and Control Conference, 1186-1190.
May 4, 2018, International Search Report and Written Opinion, PCT/NL2018/050139.
Kang et al., "Detection and tracking of moving objects from a moving platform in presence of strong parallax", Proceedings of the IEEE International Conference on Computer Vision ICCV'05, Beijing, China, Oct. 17-20, 2005.
Thomas Pollard, Matthew Antone, "Detecting and tracking all moving objects in wide-area aerial video", IEEE 2012 Computer Society on Computer Vision and Pattern Recognition Workshops, Jun. 16-21, 2012.
Bor-Jeng Chen, Gérard Medioni, "3-D mediated detection and tracking in wide area aerial surveillance", 2015 IEEE Winter Conference on Applications of Computer Vision, Jan. 5-9, 2015.

\* cited by examiner

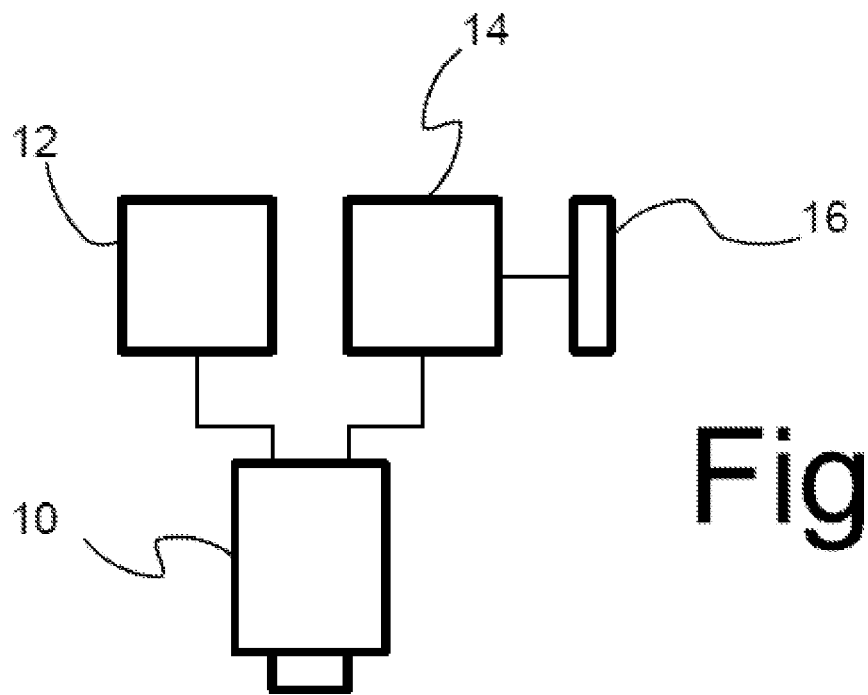
Fig.1
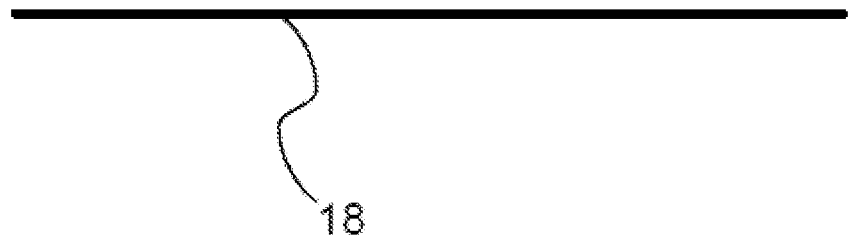

METHOD OF DETECTING MOVING OBJECTS FROM A TEMPORAL SEQUENCE OF IMAGES

CROSS-REFERENCE TO RELATED APPLICATIONS

This application is a U.S. National Stage application under 35 U.S.C. § 371 of International Application PCT/NL2018/050139 (published as WO 2018/164575 A1), filed Mar. 7, 2018 which claims the benefit of priority to Application NL 17159899.8, filed Mar. 8, 2017. Benefit of the filing date of these prior applications is hereby claimed. Each of these prior applications is hereby incorporated by reference in their entirety.

FIELD OF THE INVENTION

The invention relates to a method of detecting moving objects from a temporal sequence of images from a moving camera, and in particular to the elimination of objects which appear at different positions in the images due to parallax.

BACKGROUND

Detection of moving objects from a sequence of images involves the comparison of successive images to detect changes that can be attributed to object motion. When the images are captured using a moving camera, e.g. from an aircraft with a camera directed at the earth's surface, the positions in the image at which locations on a background surface such as the earth's surface are imaged changes in the same way. When the images are registered to eliminate such changes, the remaining changes can be due to movement of objects on the background surface. But these changes can also be due to perspective effects. Due to perspective effects, there are differences between the change of image position of features from the background and object features at a different distance to the camera, such as the tops of buildings. This is known as parallax motion.

It is known to eliminate false moving object detections that can be explained by parallax. This is described for example in an article by Bor-Jeng Chen et all titled "3-D Mediated Detection and Tracking in Wide Area Aerial Surveillance", published in the proceedings of the 2015 IEEE Winter Conference on Applications of Computer Vision, pages 396-403. The motion vectors of object features due to parallax are known to be directed along lines in the images, called epipolar lines, and the image distance of displacement along such an epipolar line depends on the 3D distance to the object feature.

The elimination of false moving object detections due to parallax includes estimation of predicted epipolar lines and the elimination of object features with motion vectors along such lines. Bor-Jeng Chen et al. determine a dense map of optical flow vectors of image position with corresponding content in successive images. Bor-Jeng Chen et al. use these flow vectors to estimate the parameters of the so-called fundamental matrix between images, from which the epipolar lines can be calculated. Bor-Jeng Chen et al. check the distance of the changed positions of object points from the corresponding epipolar line. Only object points with a distance of more than a threshold from their epipolar line are retained.

The robustness of this type of elimination depends on the reliability with which motion vectors are estimated from the images. For small object features a robust elimination is difficult.

SUMMARY

It is an object to provide for a more robust elimination of objects detected due to parallax motion.

A computer implemented method as claimed in claim 1 is provided. Herein object that move according to parallax are detected by testing regions detected in a first image. It is tested whether or not a detected regions matches any patch along an estimated direction of epipolar movement in a second image. Only regions for which there is no such matching patch along the estimated direction of epipolar movement, e.g. along a line in that direction or a strip or cone containing such a line, are retained as due to object movement. Compared to methods wherein the epipolar movement is determined by matching image regions, this provides for a more stable detection and the ability to match regions with smaller sizes. Preferably first and second images are used that are registered to each other.

The estimated direction of epipolar movement is obtained by averaging flow directions obtained from the sequence of images. This is based on the insight that objects far from the camera approximately have parallax movement in the same direction and that, although the relation between object movement and flow estimates is noise prone, an estimation of the epipolar direction that is sufficiently accurate to limit the search for matching reasons can be obtained by averaging. Preferably, average direction of the image flow vectors is performed using an averaging method that explicitly or implicitly gives variable weights to the computed image flow vectors, the weight generally decreasing, preferably to zero, with increasing difference between the computed average direction and a direction of the computed flow vector. Thus, the effect of outliers in the estimation due to freely moving objects can be reduced. Preferably the flow vectors are determined from the difference images for this purpose. This reduces the effects of noise corresponding to the background. The known Ransac method is an example of such a method.

In a further embodiment, the direction of epipolar movement is determined by computing quantities corresponding to numbers of direction angles of the image flow vectors that are contained in respective ones of plurality of predetermined angle ranges; selecting at least one selected range from of a plurality of predetermined angle ranges, wherein said quantity in the at least one selected range is larger than in any other of the plurality of predetermined angle ranges; and computing the direction of epipolar movement by averaging the direction angles contained in the least one selected range.

Preferably, the regions are identified by selecting connected regions of pixels in a first difference image wherein sizes of pixel value of all pixels in the regions exceed a threshold. The first difference image may be computed from the differences between a first pair of images from the temporal sequence of images. The first image may be the difference image or one of the images from the first pair of images. The second image may also be one of the pair of images, or an image outside the pair. Use of the difference images increases the reliability of selection of the regions for the search for matching regions along the epipolar direction.

In an embodiment both the first image and the second image are difference images computed from different pairs of images from the temporal sequence of images. This increases reliability of the search for matching regions. Preferably, each pair comprises temporally directly successive images from the sequence of images. The different pairs may share an image. This reduces the amount of computation. In a further embodiment the image flow vectors are computed from displacements of areas from the first difference image to areas in the second difference image. This increases the reliability of the epipolar direction estimate from the flow.

An embodiment involves the determination of the direction of epipolar movement comprises determining registration parameters for registering the first and second image before searching for matching regions along the epipolar direction. In a further embodiment the first and second difference image may be registered based on registration parameters for registering an image from the first pair with an image from the second pair, and registering the first and second difference image based on said registration parameters before determining the flow vectors, or applying a correction to the flow vectors according to the registration parameters before estimating the direction of epipolar movement from the image flow vectors. In this way the estimation of epipolar movement can be made more robust against disturbance by other movement In an embodiment involving the method comprises registering the images of the first pair relative to each other and registering the images of the second pair relative to each other, the first and second difference image being computed after registration of the images in first and second pair respectively.

BRIEF DESCRIPTION OF THE DRAWING

These and other objects and advantageous aspects will become apparent from a description of exemplary embodiments with reference to the following figures.

FIG. 1 shows a system for detecting moving objects

DETAILED DESCRIPTION OF EXEMPLARY EMBODIMENTS

Figure 2:
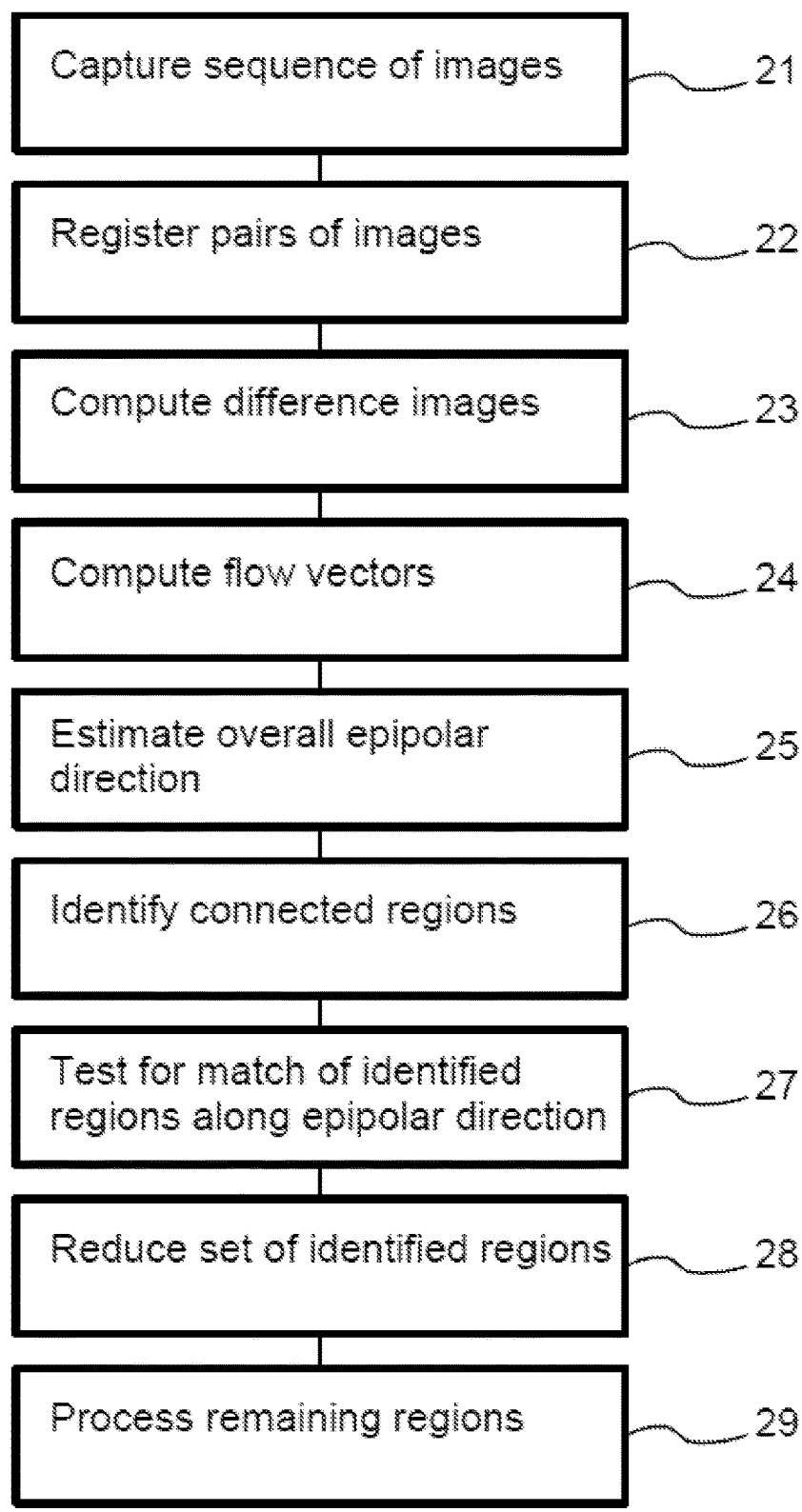
FIG. 2 shows a flow chart of detection of moving objects

FIG. 1 shows a system for detecting moving objects, the system comprising a camera 10, a memory system 12 and a processing system 14. Camera 10 and processing system 14 are coupled to memory system 12. Although a direct connection of camera 10 to memory system 12 is shown, camera 10 may be coupled to memory system 12 via processing system 14. The system may be part of an aircraft (not shown), wherein camera 10 is directed at least partly downward, for obtaining images of the earth's surface 18 during flight. Optionally, the system further comprises a display device 16 coupled to processing system 14.

FIG. 2 shows a flow chart of detection of moving objects. Processing system 14 executes steps of the method under control of a program of instructions (executed by one or more programmable processors). Where it is described that processing system 14 executes specified actions, this is used to describe that processing system does so under control of the program.

In a first step 21, images captured by camera 10 while camera is moved over the earth's surface, or another surface, are stored in memory system 12. The storage may be directly or indirectly controlled by processing system 14, and/or controlled directly by camera 10.

In a second step 22, processing system 14 registers pairs of successively captured images, that is, processing system 14 effectively computes a mapping between pixel coordinates systems of the images of the pair, the mapping being selected so that it minimize image differences between the images in the pair after mapping. Successive pairs may overlap, i.e. the last image of one pair may be the first image of the next. Processing system 14 may use any known registration algorithm for registering pairs of images. For example it may search among possible displacement vectors, for a displacement vector that has the smallest difference measure between images obtained by relative displacement of the images in the pair, when these images are mapped relative to each other according to the displacement vector.

The mapping substantially corresponds to compensation of change of the position of the background from one image to the other. Typically this is the effect of movement of the camera. In the case of a camera 10 that is directed downward, for obtaining images of the earth's surface during flight over the earth's surface, the background corresponds to the earth's surface. The mapping may be defined e.g. in terms of a two dimensional displacement vector that relates the pixel coordinate systems. But other mappings may be used, such as an affine or projective mapping corresponding to changes of the projection of the earth's surface on the image plane due to camera movement relative to the surface. This may be useful for example if camera 10 is not directed perpendicularly to the background surface.

In a third step 23 processing system 14 computes a difference image from each of the pairs mapped according to the mapping determined in second step 22. The pixel values in this difference image differ substantially from zero only in regions where the pixels show objects that are not part of the background.

In a fourth step 24 processing system 14 computes flow vectors (e.g. motion vectors) between portions of successive ones of the difference images. The flow vectors for the difference images represent flow of non-background regions, due to object movement or parallax movement of object features that lie outside the background plane. Algorithms for computing flow vectors between portions of images are known per se. Such algorithms may be similar to algorithms for registering images, e.g. to determine a displacement. A multiscale optic flow estimation algorithm may be used. A set of flow vectors may estimated from a pair of successive difference images, representing the flow from one image of the pair to the other. Alternatively, such a set may be used using more than two successive difference images, e.g. to create a bias for selecting flow vectors that possess temporal continuity. Instead of estimating the flow vectors from the difference images, the flow vectors may be estimated from motion between a pair, or a longer series, of the original images, preferably after registration.

In an embodiment, the flow vectors are computed from registered difference images. This may require an additional registration, e.g. using registration parameters determined for a combination of images from different ones of the pairs of images from which the difference images are computed. If the pairs overlap, the registration parameters for registering the difference images may be determined from the registration parameters in the pairs, as determined in second step 22, or registration of the difference images may even be unnecessary, e.g. if the difference images are both computed using a same image without mapping.

For registered images, non-zero flow vectors correspond to the presence of objects that move relative to the background and/or due to parallax. Parallax occurs for imaging of object surfaces that are at a different distance from the camera than the background. In the case of a camera 10 that is directed downward to the earth's surface during flight for example, image parts containing the upper part of buildings may exhibit parallax due to camera movement, even though the buildings do not move relative to the earth's surface in real space.

As is known per se, the direction of a flow vector due to parallax is along a so called epipolar line, which depends on the direction of movement of the camera and the position of the object. The length of the flow vector along this epipolar line depends on the distance between the object and the camera, and in the case of images of the earth's surface on the height of the object above the surface. When the distance between the camera and the surface is much larger than the height of the objects, the epipolar lines of all objects are all approximately parallel to each other.

In a fifth step 25 processing system 14 computes a representative direction (e.g. angle) of the flow vectors between the successive ones of the difference images. Processing system 14 will use this as an estimated direction of epipolar movement of all visible objects according to motion between the successive ones of the difference images. This direction of epipolar movement will be referred to as the epipolar direction. When the majority of object movement is due to parallax, and the distance between surface and camera is much larger than the height of the objects, the average direction of the flow vectors corresponds approximately to the direction of the epipolar movement. If the flow vectors are computed from unregistered difference images, a correction for overall movement may be applied to the flow vectors before computing the representative direction, e.g. according to registration parameters for registering the difference images, to simulate flow vectors of registered images as described.

Preferably, the average direction of the image flow vectors is computed using an averaging method designed to suppress effects of statistical outliers in the image flow vectors on the computed average direction. Various methods are known that are designed to suppress effects of statistical outliers in the image flow vectors. In general terms, such methods compute the average from sample values, the samples being flow vector values and more preferably angles of flow vector values when applied to the present embodiment. Such methods assign different weights to samples in computing the average, the weight generally decreasing with increasing difference between the sample value and the average. Generally decreasing means that at least successive difference ranges can be distinguished, wherein the weights are each time smaller than in the preceding range and the weight does not increase with increasing difference. Generally decreasing may mean for example that the weight may have a fixed value below a threshold difference and zero above the threshold difference.

A first type of such methods disregards sample values in the computation of the average when the sample values differ by more than some threshold from some representative sample value. For example, the known RANSAC method selects a subset of samples that lie not more than a predetermined distance from an average of all sample values or from a randomly selected sample (or consists of a predetermined number of samples that have smallest distances therefrom) and determines a final average by averaging the samples from the selected subset. The RANSAC method may add a plurality of iterations, wherein the subset of samples is selected repeatedly. In an embodiment, each iteration may use a subset of samples determined by using the final average from the previous step as a new value of the initial average. This may be repeated for example until the difference between the content successive subsets falls below a threshold number of samples, or until a predetermined number of iterations has been performs.

A second type of such methods assigns a decreasing weight to each sample value with increasing difference between the sample value and the average value to which it contributes. For example, Parzen window estimation may be used, which involves computing a probability density function of value for each value from the samples as a sum of kernel functions (e.g. Gaussians) as a function of the difference between the sample and the value, the kernel function decreasing with increasing difference between the sample and estimate. In this case the value (flow vector value) with maximum probability density may be used as an estimate of the average.

In an embodiment of the first type, processing system 14 computes the representative direction by computing a histogram of flow vector direction angles for the image portions in the image, with counts of the number of portions for different ranges of flow vector direction angle values. Flow vectors with less than a predetermined size may be excluded from this computation. Processing system 14 selects the range or ranges with the highest count, and computes an average of the angles of the image portions in that range or those ranges to obtain the estimated epipolar direction. To assign flow vectors to ranges in the histogram, direction angles may be computed from flow vectors, but in an alternative embodiment flow vectors may be assigned directly to angle ranges by using two dimensional ranges corresponding to the respective angle ranges, determining to which of the two dimensional ranges the flow vector belongs and assigning the flow vector to the angle range that corresponds to that two dimensional range. Preferably, the ranges of flow vector direction angle values all have the same size. But this is not necessary. Optionally, other quantities may be computed instead of the counts, such as a density (normalized count) in proportion to a ratio of the count and the size of the angle range. Similarly, instead of counting, summing of weights associated with different flow vectors (e.g. dependent on estimates of their reliability) may be used to count quantities corresponding to numbers of direction angles of the image flow vectors that are contained in respective ones of plurality of predetermined angle ranges.

In a sixth step 26 processing system 14 identifies connected regions of pixels in the difference images, wherein a size of the difference at the pixels exceeds a predetermined threshold value. Algorithms for identifying connected regions are known per se. They are also referred to as segmentation or labeling algorithms. For example they may be determined by initially using pixel position at which the difference image exceeds a threshold as regions, and iteratively joining pairs of regions that contain pixel positions that are neighbors of each other, until no more regions can be joined in this way. Neighboring pixel position may be defined as pixel positions for which a distance between the pixels is not larger than a predetermined threshold. As distance the maximum or sum of the x and y distances may be used for example. If the threshold distance is one pixel distance, neighboring pixels may be pixels of which one of the x,y coordinates differs by one and the other one of the x,y coordinates is the same, or as pixel positions of which none of the x,y coordinates differs by more than one. A connected region is a collection of pixel positions through which there is a path between any pair of pixel position in the region, a path being a sequence of pixel positions wherein successive pixel positions are neighboring pixel positions.

Instead of identifying fully connected regions, regions may be identified in other ways, e.g. by searching for locations to place a window of predetermined shape in the first different image at which the window contains more than a predetermined number of pixels with a pixel value that exceeds a predetermined size, etc.

In a seventh step 27 processing system 14 determines, for each of the identified regions, whether or not there is a match with the identified region along the estimated epipolar direction. Given the estimated epipolar direction obtained between a successive first and second difference image, or images from which these difference images were computed, processing system 14 may compute a measure of difference between properties of the identified region and properties associated with image patches of corresponding shape, at different displacements along the estimated epipolar direction in the second difference image. In this embodiment processing system 14 computes such a measure of difference for the identified region for a plurality of different amounts of displacement, e.g. in a predetermined range. If measure of difference for all of the displacements exceeds a predetermined threshold, there is no match (in the case that a measure of difference is used for which a larger value of the measure of difference corresponds to a greater difference; any measure of difference can be expressed in this way).

The measure of difference may be a measure of difference of the image content, such as pixel values or edge locations, of the identified region in the first difference image and of the patch in the second difference image. Instead of computing the measure of difference between the content in the difference images, processing system 14 may compute the measure of difference between the content of images from the pairs from which these difference images were computed, at locations corresponding to the region and patch for which a match is sought (along the estimated epipolar direction with a location correction for registration if necessary). The measure of difference may be a sum of squared or absolute pixel differences at corresponding pixel locations of the region and the patch for the relevant amount of displacement for example.

Processing system 14 determines whether any of the values of the measure of difference obtained for the different amounts of displacements is below a predetermined threshold. If not, there is no match with the identified region along the estimated epipolar direction. When the measure is below the threshold for an amount of displacement, no further amounts of displacement, need be tested. The predetermined threshold may be proportional to the size of the region, or the measure of difference may be normalized for the size of the region. In these or other embodiments, the threshold may alternatively be determined from a combination of values of the measures of difference along the epipolar direction.

The range of values of the different amounts of displacements along the estimated epipolar direction may extend to the edge of the image, but preferably it is limited based on the maximum expected amount of displacement given expected object heights. In an embodiment, the test for such matches may be performed only for displacements at less than a predetermined distance from zero displacement along the estimated epipolar direction.

In an embodiment, the test for such matches may be performed for a strip or cone of displacements that comprises the line along the estimated epipolar direction and pixels at no more than a predetermined distance on one or both sides of that line, or pixels for which the angle between the line and a line form the pixel to zero displacement is less than a predetermined angle. A distance of up to one, or three or five pixels from the line at the maximum displacement along the line may be used for example.

It should be noted that because the test is performed only for displacements on a line, strip or cone containing the estimated epipolar direction it requires less time than performing it outside that line, strip or cone. Moreover, this limitation reduces the probability of errors due to accidental matches. This in turn means that smaller regions can be tested with less than a maximum probability of errors, even though the probability of errors increases when the region size becomes smaller.

In an eight step 28 processing system 14 filters the set of identified regions for the first difference image, e.g. by retaining only the identified regions for which processing system 14 has determined in seventh step 27 that there is no match with the identified region along the estimated epipolar direction. In this way, identified regions that may be the effect of parallax are filtered out from the set of identified regions. In other embodiments, processing system 14 may use further factors in the filtering of the set, such as object tracking through more than two images or association of regions with surfaces in a 3D model. For example, this may be used to retain regions that are associated with objects that are predicted to move in a way that results in a displacement along the epipolar direction based on their previous track and independent of parallax.

In a ninth step 29 processing system 14 processes the remaining regions. By way of example, in ninth step 29 processing system 14 may compute an output image from one of the captured images that was used to compute the first difference images, adding highlighting of the image content in the remaining regions from eight step 28 in the output image. Such regions are expected to be due to moving objects. Highlighting may be done in any convenient way, e.g. by modifying image contrast or color saturation inside and outside the regions relative to each other, or by drawing bounding boxes around the remaining regions. Processing system 14 may cause the output image to be displayed on display device 16. Instead of display, processing based on the retained regions may be performed, e.g. to track these regions through the sequence of images, to estimate parameters of the moving objects from properties of the remaining regions or tracking results, to collect image data of the moving objects, to control filtering, etc.

Figure 3:
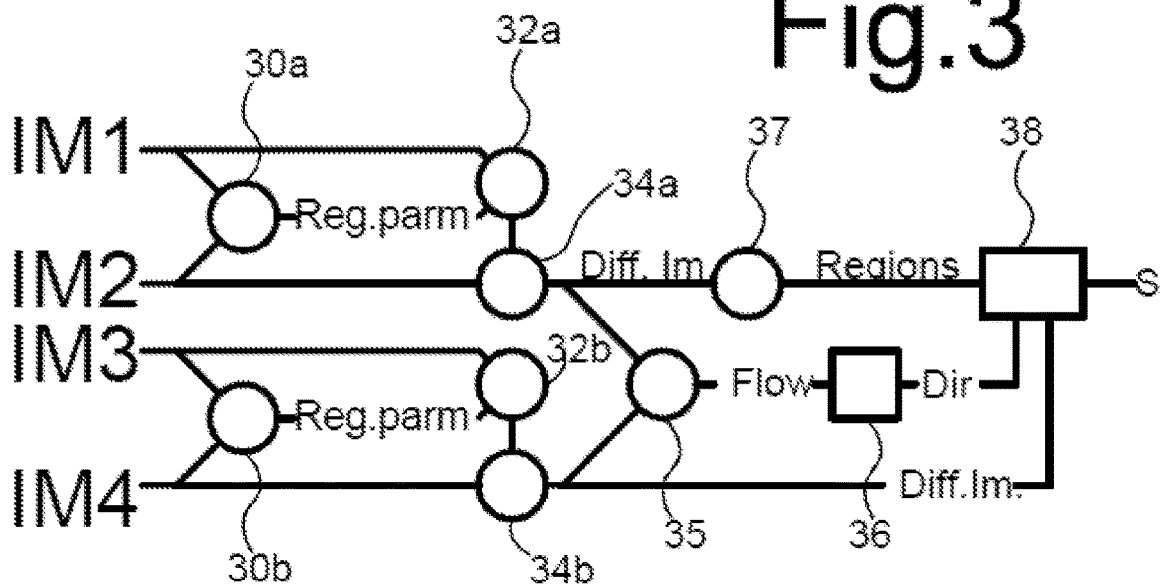
FIG. 3, 3a, 3b show signal flow of detection

FIG. 3 summarizes an embodiment of the signal flow in the computation. Four or three images IM1, IM2, IM3, IM4 are used to select a set of regions S. One of the images IM1, IM2 may be the same as one of the images IM3, IM4. In operations 30a, b registration parameters (Reg.parm) between pairs IM1, IM2 and IM3, IM4 of the images are determined, which represent e.g. a translation or perspective mapping. In operations 32a,b the registration parameters are used to register the images in the pairs. An example is shown wherein the operation 32a,b involves mapping one of the images. In operations 34a, b difference images (Diff.Im.) are determined, from respective ones of the pairs. In practice operations 32a,b may be combined with operations 34a, by using mapping to obtain pixel values for use in subtraction.

Figure 3A:
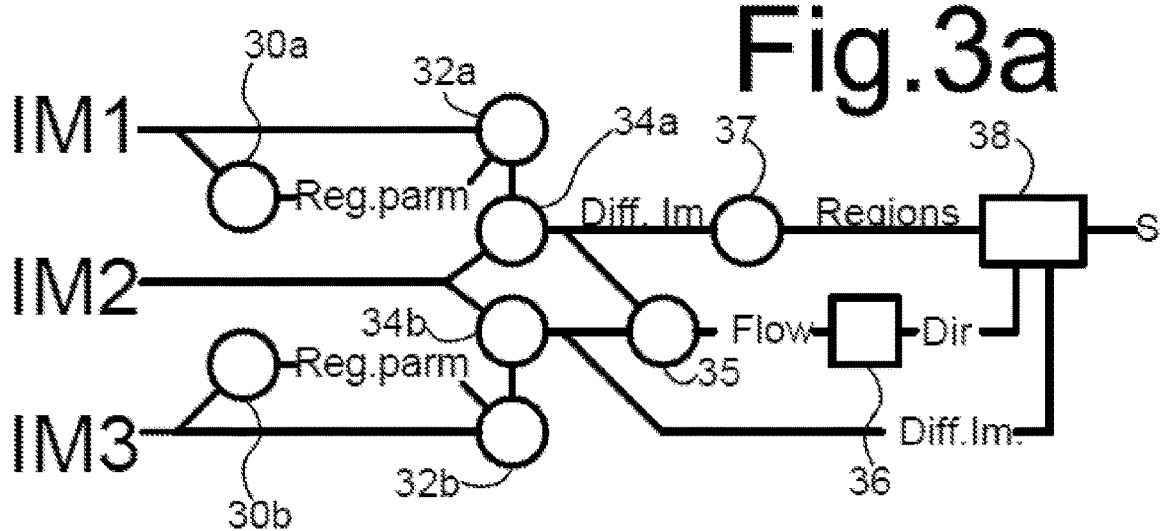

Preferably, difference images are used that are registered to each other. An additional registration operation (not shown) may be used, e.g. using registration parameters determined for the combination of IM2 and IM4. But such a registration is not needed if IM2 and IM4 are the same image, as illustrated in FIG. 3a. If one of the images IM1, IM2 is the same as one of the images IM3, IM4, but IM2 and IM4 are not the same, the registration parameters for the difference images may be determined from those for registering IM1 and IM2 and IM3 and IM4. However, alternatively, registration parameters in other ways, such as from measurements of camera position and/or orientation changes e.g. using GPS or a gyroscope, so that the parameters need not be determined from the images. Under some circumstances image registration may be dispensed with, for example if a correction for registration is applied to data extracted from the images, or camera settings are used to compensate for measured movement relative to the background of if the effects of background movement are small compared to object and parallax movement.

In an operation 35 flows between images areas in the difference images are determined. In an embodiment only pixel locations at which the size of the difference exceeds a threshold are used to determine the flow. In an operation 36, the representative direction (e.g. angle) of the flow vectors between the difference images is determined, for use as an estimated epipolar direction of the epipolar lines of all visible objects, e.g. by computing a histogram of angles.

In an operation 37, connected regions in a first one of the difference images are determined, e.g. regions of connected pixels at which the size of the difference exceeds a threshold, and in an operation 38 regions that correspond to matching patches along the estimated epipolar direction are filtered out. The operations may be repeated for successive sets of four or three images IM1, IM2, IM3, IM4. The successive sets may overlap. For example IM1 and IM2 in a current set may correspond to IM3 and IM4 or to IM2 and IM3 in a previous set of images.

It should be noted that the determination of the motion of candidate moving objects directly based on correspondences is avoided. As object detections may be unreliable (especially for small objects) the decision whether the candidate belongs to the motion model is error prone. The individual motion of the candidate object does not need to ne calculated at all when differences in appearances are used that originate from a robustly estimated epipolar direction. The decision whether motion corresponds to parallax only relies on a reasonably constant appearance of the candidate moving objects, which is a much more stable feature than their individual motion estimates.

Although FIGS. 2 and 3 illustrates a specific exemplary embodiment, it should be noted that alternative implementations are possible. When the flow is used to determine the estimated epipolar direction, determining the flow from the difference images has the advantage that the representative direction that is used as estimated epipolar direction can be determined distinct from image movement of the background. However, instead the flow may be determined from the original images.

Figure 3B:
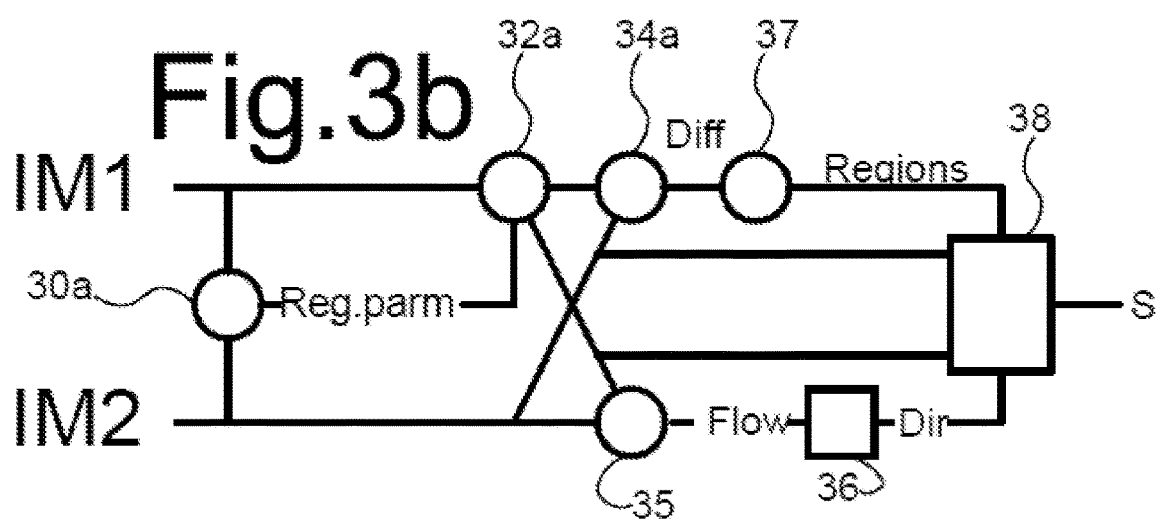

FIG. 3b summarizes an embodiment of the signal processing in such a computation. The same labels as in FIG. 3 are used for similar operations. In this embodiment, the estimated epipolar direction is determined by first estimating registration parameters of background movement in a first image IM1 relative to a second image IM2 in a registration operation 30a, registering 32a one image IM1 or both of the images IM1, IM2 to compensate for background movement and image flow determination 35 as a function of position from the images IM1, IM2 after compensation, i.e. using the original images rather than difference images. Alternatively, image flow as a function of position may be determined from the original images IM1, IM2 without registration and compensated according to the registration parameters.

Preferably, flow determination is suppressed for image areas wherein the difference between pixel values in the images IM1, IM2 after registration is below a predetermined threshold. This reduces the effect of noise on the estimate of the epipolar direction.

FIG. 3b also illustrates a second alternative, wherein the filter operation 38 uses the detection of matching patches along the estimated epipolar direction in the registered images to filter out regions. Combined with the use of the images for flow determination it suffices to use two images for detecting image regions that show potential moving objects. As in the embodiments wherein three or four images are used, the limitation of the search for matching regions to locations along the epipolar direction reduces the sensitivity to noise. However, testing for matches in the difference images has the advantage that it reduces the effect of stationary regions on the detection.

The estimation of only a single parameter (e.g. the angle) to estimate the epipolar direction has the advantage that a more stable estimate is possible. For moving cameras at sufficient distance from the objects this has been found to suffice to eliminate regions that correspond to parallax using the described method.

Although an embodiment has been shown wherein it is tested whether there are matches with a connected region as a whole are used, alternatively tests for matches with parts of a connected region may be used, e.g. when the connected region exceeds a predetermined size.

According to one aspect a computer implemented method is provided, for detecting moving objects from a temporal sequence of images captured from successive viewpoints, the method comprising
  computing a first and second difference image from a first and second pair of the images in the temporal sequence respectively;
  identifying connected regions of pixels in the first difference image wherein a size of a pixel value exceeds a threshold,
  estimating a direction of epipolar movement between the first and second difference image, based on image flow, for example by computing image flow vectors representing displacements of areas in the first difference image to the second difference image and/or in an image from the first to an image from the second pair and estimating the direction of epipolar movement from the image flow vectors, or by estimating the direction of epipolar movement from other sources, such as GPS data or other navigation data that represents the direction of movement of the camera and optionally the distance to the background (e.g. the earth's surface),
  determining, for each of the identified regions, whether or not there is a match between the identified region and a patch located within a range of positions along said direction of epipolar movement in the second difference image;
  reducing the set of identified regions by removing identified regions for which it was determined in said determining step that there was a match.

The invention claimed is:
1. A computer implemented method of detecting image regions showing moving objects from a temporal sequence of images captured from successive viewpoints, the method comprising
  computing image flow vectors from the temporal sequence of images;

computing an average direction of the image flow vectors associated with displacement of image areas between a first image and second image derived from the temporal sequence of images;

identifying regions in the first image;

determining, for each of the identified regions along a range of positions along the computed average direction from a position of the identified region, whether or not there is a match between first image content in the identified region in the first image and second image content in a patch located within said range of positions in the second image;

reducing the set of identified regions by removing identified regions for which it was determined in said determining step that there was a match within said range of positions.

2. A method according to claim 1, wherein said computing of the average direction of the image flow vectors is performed using an averaging method that implicitly or explicitly gives different weights to the computed image flow vectors, the weight generally decreasing with increasing difference between the computed average direction and a direction of the computed flow vector.

3. A method according to claim 2, comprising computing quantities corresponding to numbers of direction angles of the image flow vectors that are contained in respective ones of plurality of predetermined angle ranges;

selecting at least one selected range from of a plurality of predetermined angle ranges, wherein said quantity in the at least one selected range is larger than in any other of the plurality of predetermined angle ranges;

computing the direction of epipolar movement by averaging the direction angles contained in the least one selected range.

4. A method according to claim 1, comprising computing a first difference image between a first pair of images from the temporal sequence of images, the first image being the difference image or one of the images of the first pair of images;

identifying said regions by selecting connected regions of pixels in the first difference image wherein sizes of pixel value of all pixels in the regions exceed a threshold.

5. A method according to claim 1, comprising computing the first image and the second image by computing a first and second difference image between a first and second pair of images from the temporal sequence of images respectively.

6. A method according to claim 5, wherein the image flow vectors are computed from displacements of areas from the first difference image to areas in the second difference image.

7. A method according to claim 1, wherein all the positions in said range of positions lie on a line with a line direction along the computed average direction, or a strip or cone containing such a line.

8. A method comprising capturing the temporal sequence of images with a moving camera and applying the method of claim 1 to the captured temporal sequence of images.

9. A method according to claim 8, wherein the camera is located on a flying platform that flies over the earth's surface and the camera is directed downward toward the earth's surface.

10. A processing system comprising a program of instructions configured to cause the processing system to detect image regions showing moving objects from a temporal sequence of images captured from successive viewpoints, the instructions being configured to compute image flow vectors from the temporal sequence of images;

compute an average direction of the image flow vectors associated with displacement of image areas between a first image and second image derived from the temporal sequence of images;

identify regions in the first image;

determine, for each of the identified regions along a range of positions along the computed average direction from a position of the identified region, whether or not there is a match between first image content in the identified region in the first image and second image content in a patch located within said range of positions in the second image;

reduce the set of identified regions by removing identified regions for which it was determined in said determining step that there was a match within said range of positions.

11. A non-transitory computer readable medium having a program of instructions to cause a processing system to perform the method of claim 1.

12. The processing system of claim 10, comprising a movable camera, the instructions being configured to capture the temporal sequence of images from the movable camera.

13. The processing system of claim 10, wherein the instructions are configured to perform said computing of the average direction of the image flow vectors using an averaging method that implicitly or explicitly gives different weights to the computed image flow vectors, the weight generally decreasing with increasing difference between the computed average direction and a direction of the computed flow vector.

14. The processing system of claim 10, wherein the instructions are configured to compute quantities corresponding to numbers of direction angles of the image flow vectors that are contained in respective ones of plurality of predetermined angle ranges;

select at least one selected range from of a plurality of predetermined angle ranges, wherein said quantity in the at least one selected range is larger than in any other of the plurality of predetermined angle ranges;

compute the direction of epipolar movement by averaging the direction angles contained in the least one selected range.

15. The processing system of claim 10, wherein the instructions are configured to compute a first difference image between a first pair of images from the temporal sequence of images, the first image being the difference image or one of the images of the first pair of images;

identify said regions by selecting connected regions of pixels in the first difference image wherein sizes of pixel value of all pixels in the regions exceed a threshold.

16. The processing system of claim 10, wherein the instructions are configured to compute the first image and the second image by computing a first and second difference image between a first and second pair of images from the temporal sequence of images respectively.

17. The processing system of claim 16, wherein the instructions are configured to compute the image flow vectors from displacements of areas from the first difference image to areas in the second difference image.

* * * * *